(12) United States Patent
Green et al.

(10) Patent No.: US 9,871,244 B2
(45) Date of Patent: *Jan. 16, 2018

(54) METHOD OF FABRICATING STRUCTURED PARTICLES COMPOSED OF SILICON OR A SILICON-BASED MATERIAL AND THEIR USE IN LITHIUM RECHARGEABLE BATTERIES

(71) Applicant: NEXEON LIMITED, Oxfordshire (GB)

(72) Inventors: Mino Green, London (GB); Feng-Ming Liu, Reading (GB)

(73) Assignee: Nexeon Limited, Abingdon, Oxfordshire (GB)

( * ) Notice: Subject to any disclaimer, the term of this patent is extended or adjusted under 35 U.S.C. 154(b) by 546 days.

This patent is subject to a terminal disclaimer.

(21) Appl. No.: 14/593,674

(22) Filed: Jan. 9, 2015

(65) Prior Publication Data

US 2015/0188122 A1 Jul. 2, 2015

Related U.S. Application Data

(63) Continuation of application No. 12/669,216, filed as application No. PCT/GB2008/002452 on Jul. 17, 2008, now Pat. No. 8,940,437.

(30) Foreign Application Priority Data

Jul. 17, 2007 (GB) .................................... 0713898.5

(51) Int. Cl.
H01M 4/134 (2010.01)
H01M 4/1395 (2010.01)
(Continued)

(52) U.S. Cl.
CPC ......... *H01M 4/134* (2013.01); *H01M 4/0492* (2013.01); *H01M 4/1395* (2013.01);
(Continued)

(58) Field of Classification Search
CPC ........ H01M 4/00–4/0497; H01M 4/13; H01M 4/134; H01M 4/139; H01M 4/1395;
(Continued)

(56) References Cited

U.S. PATENT DOCUMENTS 3,351,445 A 11/1967 Fielder et al.
4,002,541 A 1/1977 Streander
(Continued)

FOREIGN PATENT DOCUMENTS

CN 1821446 A 8/2006
CN 101266919 A 9/2008
(Continued)

OTHER PUBLICATIONS

Liu et al., "Enhanced Cycle Life of Si Anode for Li-Ion Batteries by Using Modified Elastomeric Binder", Electrochemical and Solid-State Letters, 8(2), pp. A100-A103 (2005).
(Continued)

Primary Examiner — Jonathan Crepeau
Assistant Examiner — Jacob Buchanan
(74) Attorney, Agent, or Firm — McDonnell Boehnen Hulbert & Berghoff LLP

(57) ABSTRACT

Pillared particles of silicon or silicon-comprising material and a method of fabricating the same are disclosed. These particles may be used to create both a composite anode structure with a polymer binder, a conductive additive and a metal foil current collector, and an electrode structure. The structure of the particles overcomes the problems of charge/discharge capacity loss.

42 Claims, 4 Drawing Sheets

(51) Int. Cl.
*C30B 29/62* (2006.01)
*H01M 4/04* (2006.01)
*H01M 4/38* (2006.01)
*H01M 10/52* (2006.01)
*H01M 4/02* (2006.01)

(52) U.S. Cl.
CPC ........... *H01M 4/386* (2013.01); *H01M 10/52* (2013.01); *H01M 2004/027* (2013.01); *Y02E 60/122* (2013.01); *Y02P 70/54* (2015.11); *Y10T 29/49108* (2015.01); *Y10T 117/102* (2015.01); *Y10T 428/2982* (2015.01)

(58) Field of Classification Search
CPC .................. H01M 4/38; H01M 4/386; H01M 10/00–10/0525
See application file for complete search history.

(56) References Cited

U.S. PATENT DOCUMENTS

| | | | |
|---|---|---|---|
| 4,436,796 A | 3/1984 | Huggins et al. |
| 4,950,566 A | 8/1990 | Huggins et al. |
| 5,260,148 A | 11/1993 | Idota |
| 5,262,021 A | 11/1993 | Lehmann et al. |
| 5,658,691 A | 8/1997 | Suzuki et al. |
| 5,660,948 A | 8/1997 | Barker |
| 5,907,899 A | 6/1999 | Dahn et al. |
| 5,922,493 A | 7/1999 | Humphrey et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,190,951 B1 | 2/2001 | Nakahori et al. |
| 6,235,427 B1 | 5/2001 | Idota et al. |
| 6,280,697 B1 | 8/2001 | Zhou et al. |
| 6,296,969 B1 | 10/2001 | Yano et al. |
| 6,313,015 B1 | 11/2001 | Lee et al. |
| 6,319,769 B1 | 11/2001 | Cho |
| 6,334,939 B1 | 1/2002 | Zhou et al. |
| 6,337,156 B1 | 1/2002 | Narang et al. |
| 6,353,317 B1 | 3/2002 | Green et al. |
| 6,395,427 B1 | 5/2002 | Sheem |
| 6,399,177 B1 | 6/2002 | Fonash et al. |
| 6,399,246 B1 | 6/2002 | Vandayburg et al. |
| 6,432,579 B1 | 8/2002 | Tsuji |
| 6,514,395 B2 | 2/2003 | Zhou et al. |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,624,258 B1 | 9/2003 | Nikkeshi |
| 6,682,849 B2 | 1/2004 | Narang et al. |
| 6,872,645 B2 | 3/2005 | Duan |
| 6,881,520 B1 | 4/2005 | Li |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,151,209 B2 | 12/2006 | Empedocles et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,413,819 B2 | 8/2008 | Hattori |
| 7,425,285 B2 | 9/2008 | Asao et al. |
| 7,476,469 B2 | 1/2009 | Ota et al. |
| 7,531,155 B2 | 5/2009 | Li et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,816,031 B2 | 10/2010 | Cui et al. |
| 7,862,933 B2 | 1/2011 | Okumura et al. |
| 7,879,734 B2 | 2/2011 | Fukutani et al. |
| 8,034,485 B2 | 10/2011 | Dehn et al. |
| 8,124,279 B2 | 2/2012 | Petrat et al. |
| 8,357,475 B2 | 1/2013 | Niu et al. |
| 8,440,369 B2 | 5/2013 | Niu et al. |
| 8,585,918 B2 | 11/2013 | Green et al. |
| 8,597,831 B2 | 12/2013 | Green et al. |
| 8,772,174 B2 | 7/2014 | Green et al. |
| 8,940,437 B2 | 1/2015 | Green et al. |
| 9,252,426 B2 | 2/2016 | Green |
| 2001/0023986 A1 | 9/2001 | Mancevski |
| 2001/0024387 A1 | 9/2001 | Raaijmakers |
| 2002/0121460 A1 | 9/2002 | Moy et al. |
| 2003/0135989 A1 | 7/2003 | Huggins et al. |
| 2003/0150378 A1 | 8/2003 | Winterton et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0009224 A1 | 1/2005 | Yang et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0097691 A1 | 5/2005 | Tsuchiya et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1 | 5/2006 | Green |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0003835 A1 | 1/2007 | Hasegawa et al. |
| 2007/0020521 A1 | 1/2007 | Obrovac et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasegawa et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |

(56) References Cited

U.S. PATENT DOCUMENTS

| | | |
|---|---|---|
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0044732 A1 | 2/2008 | Salot |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0143227 A1 | 6/2009 | Dubrow et al. |
| 2009/0162750 A1 | 6/2009 | Kawakami |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2011/0000846 A1 | 1/2011 | Ishizuka et al. |
| 2011/0039690 A1 | 2/2011 | Niu |
| 2011/0104480 A1 | 5/2011 | Malekos et al. |
| 2011/0309306 A1 | 12/2011 | Zhou et al. |
| 2015/0140333 A1 | 5/2015 | Niu |

FOREIGN PATENT DOCUMENTS

| | | |
|---|---|---|
| CN | 101442124 A | 5/2009 |
| CN | 101471457 A | 7/2009 |
| CN | 100540456 | 9/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2051317 A1 | 4/2009 |
| EP | 2 058 882 | 5/2009 |
| EP | 2 204 868 A3 | 7/2010 |
| FR | 2 885 913 B1 | 8/2007 |
| GB | 980513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 6-283156 | 10/1994 |
| JP | H07-202023 A | 8/1995 |
| JP | 10-046366 | 2/1998 |
| JP | 10-83817 | 3/1998 |
| JP | H10-097833 A | 4/1998 |
| JP | 10-199524 | 7/1998 |
| JP | 2000-3727 | 1/2000 |
| JP | 2000-173594 | 6/2000 |
| JP | 2000-348730 A | 12/2000 |
| JP | 2001-291514 | 10/2001 |
| JP | 2002-260637 A | 9/2002 |
| JP | 2002-279974 A | 9/2002 |
| JP | 2002-313319 A | 10/2002 |
| JP | 2002-313345 A | 10/2002 |
| JP | 2003-017040 | 1/2003 |
| JP | 2003-168426 | 6/2003 |
| JP | 04-607488 | 2/2004 |
| JP | 2004-71305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007-080827 A | 3/2007 |
| JP | 2007-165079 A | 6/2007 |
| JP | 2007318057 A | 12/2007 |
| JP | 2008-034266 | 2/2008 |
| JP | 2008-186732 | 8/2008 |
| JP | 2008-210618 A | 9/2008 |
| JP | 2008-234988 | 10/2008 |
| JP | 2008235258 A | 10/2008 |
| JP | 2008-277000 A | 11/2008 |
| JP | 2009-523923 A | 6/2009 |
| JP | 2009-252348 A | 10/2009 |
| JP | 2010-192444 A | 9/2010 |
| JP | 5000787 B2 | 8/2012 |
| JP | 2013-510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 2003/011251 | 2/2003 |
| WO | WO 03/063271 A1 | 7/2003 |
| WO | WO 03/075372 A2 | 9/2003 |

(56) References Cited

FOREIGN PATENT DOCUMENTS

| WO | WO 20041042851 A2 | 5/2004 |
|---|---|---|
| WO | WO 20041052489 A2 | 6/2004 |
| WO | WO 20041083490 A2 | 9/2004 |
| WO | WO 20041109839 A1 | 12/2004 |
| WO | WO 2005/011030 A1 | 2/2005 |
| WO | WO 2005/075048 A1 | 8/2005 |
| WO | WO 2005/096414 | 10/2005 |
| WO | WO 2005/113467 A1 | 12/2005 |
| WO | WO 2005/119753 A2 | 12/2005 |
| WO | WO 2006/062947 | 6/2006 |
| WO | WO 2006/067891 A1 | 6/2006 |
| WO | WO 2007/071778 | 6/2006 |
| WO | WO 2006/073427 A2 | 7/2006 |
| WO | WO 2006/120332 A2 | 11/2006 |
| WO | WO 2007/037787 A1 | 4/2007 |
| WO | WO 2007/044315 A1 | 4/2007 |
| WO | WO 2007/061945 | 5/2007 |
| WO | WO 2007/083152 A1 | 7/2007 |
| WO | WO 2007/083155 A1 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 20081044683 A1 | 4/2008 |
| WO | WO 20081072460 A1 | 6/2008 |
| WO | WO 20081097723 A1 | 8/2008 |
| WO | WO 2008/139157 A1 | 11/2008 |
| WO | WO 2009/010757 A1 | 1/2009 |
| WO | WO 2009/010758 A1 | 1/2009 |
| WO | WO 2009/010759 A1 | 1/2009 |
| WO | WO 2009/026466 A1 | 2/2009 |
| WO | WO 2009/120404 A1 | 10/2009 |
| WO | WO 2009/128800 A1 | 10/2009 |
| WO | WO 2010/040985 A1 | 4/2010 |
| WO | WO 2010/040986 A1 | 4/2010 |
| WO | WO 2010/060348 A1 | 6/2010 |
| WO | WO 2010/128310 A1 | 11/2010 |
| WO | WO 2010/130975 A1 | 11/2010 |
| WO | WO 2010/130976 A1 | 11/2010 |
| WO | WO 2013/128201 | 9/2013 |
| WO | WO 2016/027081 | 2/2016 |
| WO | WO 2016/092335 | 6/2016 |

OTHER PUBLICATIONS

Lu et al., "A Study of the Mechanisms of Erosion in Silicon Single Crystals Using Hertzian Fracture Tests", Wear, 186-187, pp. 105-116 (1995).
Maranchi et al., "Interfacial Properties of the a-Si/Cu: Active-Inactive Thin-Film Anode Systems for Lithium-Ion Batteries", Journal of the Electrochemical Society: 153(6), pp. A1246-A1253 (2006).
Nakahata et al., "Fabriacation of Lotus-Type Porous Silicon by Unidirectional Solidification in Hydrogen", Materials Science and Engineering, A384, pp. 373-376 (2004).
Niparko, J.K (Editor), "Cochlear Implant Technology", Pub., Lippincott Williams and Wilkins, Philadelphia, pp. 108-121 (2000).
Obrovac et al., "Structural Changes in Silicon Anodes During Lithium Insertion/Extraction", Electrochemical and Solid-State Letters, 7(5) pp. A96-A96 (2004).
Ohara et al., "A Thin Film Silicon Anode for Li-Ion Batteries Having a Very Large Specific Capacity and Long Cycle Life", Journal of Power Sources, 136, pp. 303-306 (2004).
Pei et al., "Silicon Nanowires Gown from Silicon Monoxide Under Hydrothermal Conditions", Journal of Crystal Growth, 289, pp. 423-427 (2006).
Peng et al., "Synthesis of Large-Area Silicon Nanowire Arrays via Self-Assembling Nanoelectrochemistry", Adv. Mater., 14, No. 16, pp. 1164-1167 (2002).
Peng et al., "Dendrite-Assisted Growth of Silicon Nanowires in Electroless Metal Depostion", Adv. Funct. Mater., 12, No. 2, pp. 127-132 (2003).
Peng et al., "Simultaneous Gold Deposition and Formulation of Silicon Nanowire Arrays", Journal of Electroanalytical Chemistry, 558, pp. 35-39 (2003).
Peng et al., "Fabrication of Large-Area Silicon Nanowire p-n Junction Diode Arrays", Adv. Mater. vol. 16, No. 1, pp. 73-76 (2004).
Peng et al., "Uniform, Axial-Orientation Alignment of One-Dimensional Single-Crystal Silicon Nanostructure Arrays", Angew. Chem. Ind. Ed., 44, pp. 2737-2742 (2005).
Peng et al., "Fabrication of Single-Crystalline Silicon Nanowires by Scratching a Silicon Surface with Catalytic Metal Particles", Adv. Funct. Mater., 16, pp. 387-394 (2006).
Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).
Peng et al., "Silicon Nanowires for Rechargeable Lithium-Ion Battery Anodes", Applied Physices Letters, vol. 93, No. 3, pp. 33105-1 to 33015-3 (2008).
Qiu et al., "Self-Assembled Growth and Optical Emission of Silver-Capped Silicon Nanowires", Applied Physics Letters, vol. 84, No. 19, pp. 3867-3869 (2004).
Qiu et al., "From S1 Nanotubes to Nanowires: Synthesis, Characterization, and Self-Assembly", Journal of Crystal Growth, 277, pp. 143-148 (2005).
Russo et al., "A Mechanical Approach to Porous Silicon Nanoparticles Fabrication", Materials 2011, vol. 4, pp. 1023-1033.
Sharma et al., "Thermodynamic Properties of the Lithium-Silicon System", J. Electrochem. Soc.: Electrochemical Science and Technology, vol. 123, pp. 1763-1768 (1976).
Shin et al., "Porous Silicon Negative Electrodes for Rechargeable Lithium Batteries", Journal of Power Sources, 139, pp. 314-320 (2005).
Sugama et al., "Nature of Interfacial Interaction Mechanisms Between Polyacrylic Acid Macromolecules and Oxide Metal Surfaces", Journal of Materials Science, 19, pp. 4045-4056 (1984).
Takami et al., "Silicon Fiber Formed on Silicon Without Using a Gas Process", Journal of Applied Physics, vol. 91, No. 12, 2-5 (2002).
Tokoro et al., "Anisotropic Etching Properties of Silicon in KOH and TMAH Solutions", Proceedings of the 1998 International Symposium on Micromechatronics and Human Science, pp. 65-70 (1998).
Tsuchiya et al., "Structural Fabrication Using Cesium Chloride Island Arrays as a Resist in a Fluorocarbon Reactive Ion Etching Plasma", Electrochemical and Solid-State Letters, 3(1), pp. 44-46 (2000).
Ui et al., "Improvement of Electrochemical Characteristics of Natural Graphite Negative Electrode Coated With Polyacrylic Acid in Pure Propylene Carbonate Electrolyte", Journal of Power Sources, 173(1), pp. 518-521 (2007).
Wagner et al., "Vapor-Liquid-Solid Mechanism of Single Crystal Growth", Applied Physics Letters, vol. 4, No. 5, pp. 89-90 (1964).
Wen et al., "Chemical Diffusion in Intermediate Phases in the Lithium-Silicon System", Journal of Solid State Chemistry, 37, pp. 271-278 (1981).
Weydanz et al., "A Room Temperature Study of the Binary Lithium-Silicon and the Ternary Lithium-Chromium-Silicon System for Use in Rechargeable Lithium Batteries", Journal of Power Sources, 81-82, pp. 237-242 (1999).
Winter et al., "Insertion Electrode Materials for Rechargeable Lithium Batteries", Advanced materials, 10, No. 10 (1998).
Wong et al., "Controlled Growth of Silicon Nanowires Synthesized Via Solid-Liquid-Solid Mechanism", Science and Technology of Advanced Materials, 6, pp. 330-334 (2005).
Yabuuchi et al., "Graphite-Silicon-Polyacrylate Negative Electrodes in Ionic Liquid Electrolyte for Safer Rechargeable Li-Ion Batteries", Advanced Energy Materials, 1, pp. 759-765 (2011).
Yan et al., "Growth of Amorphous Silicon Nanowires via a Solid-Liquid-Solid Mechanism", Chemical Physics Letters, 323, pp. 224-228 (2000).
Yan et al., "H2-Assisted Control Growth of Si Nanowires", Journal of Crystal Growth, 257, pp. 69-74 (2003).

(56) References Cited

OTHER PUBLICATIONS

Ye et al., "Controllable Growth of Silver Nanostructures by a Simple Replacement Reaction and Their SERS Studies", Solid State Sciences 11, pp. 1088-1093 (2009).
Yoshio et al., "Electrochemical Behaviors of Silicon Based Anode Material", Journal of Power Sources, 153, pp. 375-379 (2006).
Zhang et al., "Bulk-Quantity Si Nanowires Synthesized by SiO Sublimation", Journal of Crystal Growth, 212, pp. 115-118 (2000).
Zhang et al., "Synthesis of Thin Si Whiskers (Nanowires) Using SiCl4", Journal of Crystal Growth, 2006, pp. 185-191 (2001).
Zhang et al., "Catalytic Growth of x-FiSi2 and Silicon Nanowires", Journal of crystal Growth, 280, pp. 286-291 (2005).
Zhang et al., "A Review on Electrolyte Additives for Lithium-Ion Batteries", Journal of Power Sources, 162(2), pp. 1379-1394 (2006).
H.W. Lau et al., "High aspect ratio silicon pillars fabricated by electrochemical etching and oxidation of macroporous silicon," Thin Solid Films, 276, 29-31 (1996).
Hong Li et al., "The crystal structural evolution of nano-Si anode caused by lithium insertion and extraction at room temperature," Solid State Ionics, 135, 181-91 (2000).
Zhang et al., "A Review on Electrolyte Additives for Lithium-Ion Batteries", Journal of Power Sources, 162(2), 1379-1394, (2006).
Petition for Inter Partes Review of U.S. Pat. No. 8,597,831, IPR 2016-01528, filed Aug. 2, 2016.
Declaration of Dr. Walter van Schalwijk, IPR 2016-01528, filed Aug. 2, 2016.
Declaration of Professor Otto Zhou, IPR 2016-01528, filed Aug. 2, 2016.
First Amended Complaint filed May 5, 2016 in *Nexeon Limited* v. *EaglePicher Technologies', LLC and OneD Material LLC,* United States District Court District of Delaware, Case No. 1:15-cv-00955.
Morales & Lieber, "A Laser Ablation Method for the Synthesis of Crystalline Semiconductor Nanowires," Science, 279, 208-211 (1998).
G.W. Zhou, H. Li, et. al., "Controlled Li Doping of Si Nanowires by Electrochemical Insertion Method," Applied Physics Letters, vol. 75, No. 16, p. 2447-2449 (Oct. 18, 1999).
Hong Li et al., "The Crystal Structural Evolution of nano-Si Anode caused by Lithium Insertion and Extraction at Room Temperature," Solid State Ionics 135, 181-91 (2000).
Gao et al., "Alloy Formation in Nanostructured Silicon," Advanced Materials vol. 12, No. 11, pp. 816-819 (Jun. 5, 2001).
J. M. Tarascon, D. Guyomard and G. L. Baker, "An update of the Li metal-free rechargeable battery based on Li1+xMn2O4 cathodes and carbon anodes," Journal of Power Sources, 43-44, 689-700 (1993).
Gao, B, "Synthesis and Electrochemcial Properties of Carbon Nanotubes and Silicon Nanowires", Ph.D. Thesis in Applied and Material Sciences, University of North Carolina Chapel Hill (2001).
Declaration of Carol Wadke re Public Availability of Gao Thesis, Jun. 23, 2016.
M. Wakihara, "Recent development in lithium ion batteries," Materials Science and Engineering R33, pp. 109-134 (2001).
Advances in Lithium-Ion Batteries, Edited by Walter A. van Schalkwijk and Bruno Scrosati, edited 2002 (Excerpts).
Dr. Martin Winter and Dr. Ralph J. Brodd, "What Are Batteries, Fuel Cells, and Supercapacitors?" Chem. Rev. 104, 4245-4269 (2004).
S. Sinha, B. Gao, and O. Zhou, "Synthesis of silicon nanowires and novel nano-dendrite structures," Journal of Nanoparticle Research 6: 421-425 (2004).
GB Patent Application No. 0601319.7, filed Jan. 23, 2006.
Cui et al., "Doping and Electrical Transport in Silicon Nanowires," Journal of Physical Chemistry, vol. 104, No. 22, pp. 5213-5216 (Jun. 8, 2000).
K. Kuriyama, T. Maeda, and A. Mizuno, "Anomalous electrical resistivity and photovoltaic phenomenon in the fast mixed conductor lithium silicide Li12Si17," Physical Review, vol. 38, No. 18, pp. 13436-13438 (Dec. 1988).

J A Meijer, C van der Marel, P Kuiper and W van der Lugt, "Electrical resistivity and 7Li Knight shift of liquid Li—Si alloys," J. Phys.: Condens. Matter I, 5283-5289 (1989).
S. Sinha et al., "Synthesis of Silicon Nanowires and Novel Nano-Dendrite Structures," CP544, Electronic Properties of Novel Materials—Molecular Nanostructures, 431-436 (2000).
Cullis et al., "Structural and luminescence properties of porous silicon," Applied Physics Reviews, 82(3) 909-965 (1997).
K.H. Jung et al., "Developments in Luminescent Porous Si," J. Electrochem. Soc., 140(10), 3046-3064 (1993).
S. Shih et al., "Transmission electron microscopy study of chemically etched porous Si," Appl. Phys. Lett., 62(5), 467-69 (1993).
Peng Yun et al., "Comparative Analysis of Two Different Treatment Technology in PCB Spent Etching," Printed Circuit Information, 2007, No. 7, 52-54 (2007), English Language Abstract.
O. Uzun et al., "Production and Structure of Rapidly Solidified Al—Si Alloys," Turk. J. Phys., 25, 455-466 (2001).
International Search Report for PCT/GB2008/002452 dated Jan. 13, 2009.
Written Opinion of the International Searching Authority for PCT/GB2008/002452 dated Jan. 13, 2009.
http://www.keytometals.com/page.aspx?ID=CheckArticle &LN=EN&site=KTN&NM=80, Aluminum-Silicon Alloys: Key to Metals Article, 3 pages, Oct. 26, 2011.
Badel et al., "Formation of Ordered Pore Arrays at the Nanoscale by Electrochemical Etching of N-Type Silicon", Superlattices and Microstructures, 36, pp. 245-253 (2004).
Barraclough et al., "Cold Compaction of Silicon Powders Without a Binding Agent", Materials Letters, 61, pp. 485-487 (2007).
Beaulieu et al., "Reaction of Li with Grain-Boundary Atoms in Nanostructured Compounds", Journal of The Electrochemical Society, 147(9), pp. 3206-3212 (2000).
Beaulieu et al., "Colossal Reversible Volume Changes in Lithium Alloys", Electrochemical and Solid-State Letters, 4(9), pp. A137-A140 (2001).
Besenhard et al., "Will Advanced Lithium-Alloy Anodes have a Chance in Lithium-Ion Batteries?", Journal of Power Sources, 68, pp. 87-90 (1997).
Boukamp et al., "All-Solid Lithium Electrodes with Mixed-Conductor Matrix", J. Electrochem. Soc.: Electrochemical Science and Technology, vol. 128, No. 4, pp. 725-729 (1981).
Bourderau et al., "Amorphous Silicon as a Possible Anode Material for Li-Ion Batteries", Journal of Power Sources, 81-82, pp. 233-236 (1999).
Canham, L.T., "Diffusion of Li IN Si", Properties of Silicon, EMIS Datareviews Series No. 4, pp. 454-462 (1987).
Chan et al., "Surface Chemistry and Morphology of the Solid Electrolyte Interphase on Silicon Nanowire Lithium-Ion Battery Anodes", Journal of Power Sources, 189(2), 1132-1140, (2009).
Chang et al., "Ultrafast Growth of Single-Crystalline Si Nanowires", Materials Letters, 60, pp. 2125-2128 (2006).
Chen et al., "Selective Etching of Silicon in Aqueous Ammonia Solution", Sensors and Actuators, A 49, pp. 115-121 (1995).
Chen et al., "Binder Effect on Cycling Performance of Silicon/Carbon Composite Anodes for Lithium Ion Batteries", 36, pp. 1099-1104 (2006).
Chen et al., "Effect of Vinylene Carbonate (VC) as Electrolyte Additive on Electrochemical Performance of Si Film Anode for Lithium Ion Batteries", Journal of Power Sources, 174(2), pp. 538-543 (2007).
Chevrier et al., "Methods for Successful Cycling of Alloy Negative Electrodes in Li-Ion Cells", 220th ECS Meeting, Abstract #1237 (2011).
Choi et al., "Effect of Fluoroethylene Carbonate Additive on Interfacial Properties of Silicon Thin-Film Electrode", Journal of Power Sources, 161(2), pp. 1254-1259 (2006).
Colinge, Jean-Pierre, "Silicon-on-Insulator Technology: Materials to VLSI", Chapert 2, SOI materials Cover page and p. 38 (1991).
Deal et al., "General Relationship for the Thermal Oxidation of Silicon", Journal of Applied Physics, vol. 36, No. 12, pp. 3770-3778 (Dec. 1965).

(56) References Cited

OTHER PUBLICATIONS

De Angelis et al., "Water Soluble Nanoporous Nanoparticles for In Vivo Targeted Drug Deliver and Controlled Release in B Cells Tumor Context", Nanoscale, 1020, vol. 2, pp. 2230-2236.
El Ouantani et al., "The Effect of Vinylene Carbonate Additive on Surface Film Formation on Both Electrodes in Li-Ion Batteries", J. Electrochem. Soc., 156(2), A103-A113 (2009).
European Search Report corresponding to EP 10 002797 dated Jun. 7, 2010.
Feng et al., "Lithography-Free Silicon Micro-Pillars as Catalyst Supports for Microfabricated Fuel Cell Applications", Electrochemistry Communications, 8, pp. 1235-1238 (2006).
Garrido et al., "The Role of Chemical Species in the Passiviation of <100> Silicon Surfaces by HF in Water-Ethanol Solutions", J. Electrochem Soc., vol. 143, No. 12, 1996, pp. 4059-4066.
Green et al., "Quantum Pillar Structures on n+ Gallium Arsenide Fabricated Using "Natural" Lithography", Appl. Phys. Lett., 62(3), pp. 264-266 (1993).
Green et al., "Mesoscopic Hemisphere Arrays for Use as Resist in Solid State Structure Fabrication", J. Vac. Sci. Technol. B 17(5), pp. 2074-2083 (1999).
Green et al., "Structured Silicon Anodes for Lithium Battery Applications", Electrochemical and Solid-State Letters, 6 (5), pp. A75-A79 (2003).
Han et al., "Neutralized Poly (Acrylic Acid) as Polymer Binder for High Capacity Silicon Negative Electrodes", 220th ECS Meeting, Abstract #1250 (2011).
Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).
Hochgatterer et al., "Silicon/Graphite Composite Electrodes for High Capacity Anodes: Influence of Binder Chemistry on Cycling Stability", Electrochemical and Solid-State Letters, 11 (5) A76-A80 (2008).
Huggins, Robert A., "Lithium Alloy Anodes" in Handbook of Battery Materials, J.O. Besenhard Ed., Wiley-VCH, Weinheim, pp. 361-381 (1999).
Ivanovskaya et al., "The Effect of Treatment of Cation-Selective Glass Electrodes With AgNO3 Solution on Electrode Properties", Sensors and Actuators B 24-25, pp. 304-308 (1995).
Jianfeng et al., "Large-Scale Array of Highly Oriented Silicon-Rich Micro/Nanowires Induced by Gas Flow Steering", Solid State Communications, 133, pp. 271-275 (2005).
Kasavajjula et al., "Nano- and Bulk-Silicon-Based Insertion Anodes for Lithium-Ion Secondary Cells", Journal of Power Sources, 163, pp. 1003-1039 (2007).
Kim et al., "(110) Silicon Etching for High Aspect Ratio Comb Structures", 1997 6th International Conference on Emerging Technologies and Factory Automation Proceedings, pp. 248-252 (1997).
Kim et al., "Improvement of Silicon Powder Negative Electrodes by Copper Electroless Deposition for Lithium Secondary Batteries", Journal of Power Sources, 147, pp. 227-233 (2005).
Kleimann et al., "Formation of Wide and Deep Pores in Silicon by Electrochemical Etching", Materials Science and Engineering, B69-70, pp. 29-33 (2000).
Kolasinski, Kurt W., "Silicon Nanostructures from Electroless Electrochemical Etching", Current Opinion in Solid State and Materials Science, 9, pp. 73-83 (2005).
Komba et al., "Functional Interface of Polymer Modified Graphite Anode", Journal of Power Sources, 189, pp. 197-203, (2009).
Komba et al., "Polyacrylate Modifier for Graphite Anode of Lithium-Ion Batteries", Electrochemical and Solid-State Letters, 12(5), A107-A110 (2009).
Komba et al., "Polyacrylate as Functional Binder for Silicon and Graphite Composite Electrode in Lithium-Ion Batteries", Electrochemistry, 79(1), 6-9, (2011).
Komba et al., "Study on Polymer Binders for High-Capacity SiO Negative Electrode of Li-Ion Batteries", Journal of Physical Chemistry, 115, pp. 13487-13495 (2011).

Lang, Walter, "Silicon Microstructuring Technology", Materials Science and Engineering, R17, pp. 1-55 (1996).
Lee et al., "Effect of Poly (Acrylic Acid) on Adhesion Strength and Electrochemical Performance of Natural Graphite Negative Electrode for Lithium-Ion Batteries", Journal of Power Sources, 161(1), pp. 612-616 (2006).
Li et al., "A High Capacity Nano-Si Composite Anode Material for Lithium Rechargeable Batteries", Electrochemical and Solid State Letters, 2(11) pp. 547-549 (1999).
Li et al., "The Crystal Structural Evolution of naon-si Anode Caused by Lithium Insertion and Extraction at Room Temperature", Solid State Ionics, 135, pp. 181-191 (2000).
Li et al., "Sodium Carboxymethyl Cellulose: A Potential Binder for Si Negative Electrodes for Li-Ion Batteries", Electrochemical and Solid State Letters, 10(2), pp. A17-A20 (2007).
Liu et al., "A Novel Method of Fabricating Porous Silicon Material: Ultrasonically Enhanced Anodic Electrochemical Etching", Solid State Communications, 127, pp. 583-588 (2003).
Liu et al., "Effect of Electrode Structure on Performance of Si Anode in Li-Ion Batteries: Si Particle Size and Conductive Additive", Journal of Power Source, 140, pp. 139-144 (2005).
Affidavit from Prof. Mino Green, submitted in the prosecution of U.S. Appl. No. 13/286,740 with respect to US 2002/0l48727.
Albuschies et al., "High-density silicon nanowire growth from self-assembled Au nanoparticles," Microelectronic Engineering 83(4-9):1530-1533 (2006).
Aricò et al., "Nanostructured materials for advanced energy conversion and storage devices," Nature Materials 4, 366-377 (2005).
Barsotti et al., "Imaging, Structural and Chemical Analysis of Silicon Nanowires," Appl. Phys. Lett. 81, 2866 (2002).
Bilyalov et al., "Comparative analysis of chemically and electrochemically formed porous Si antireflection coating for solar cells," J. Electrochem. Soc. 150(3):G216-G222 (2003).
Campbell et al., "Spectral and Structural Features of Porous Silicon Prepared by Chemical and Electrochemical Etching Processes," Journal of Vacuum Science & Technology B, Nanotechnology and Microelectronics: Materials, Processing, Measurement, and Phenomena 13, 1184 (1995).
Canham, "Silicon quantum wire array fabrication by electrochemical and chemical dissolution of wafers," Appl. Phys. Lett. 57, 1046-1048 (1990).
Canham, "Nanoscale semiconducting silicon as a nutritional food additive," Nanotechnology 18(18):185704 (Apr. 2007).
Chan et al., "High-performance lithium battery anodes using silicon nanowires," Nature Nanotechnology 3(1):31-5 (Jan. 2008).
Chandler-Henderson et al., "The impact of sonication on the structure and properties of stain-etch porous silicon," Electrochem. Soc.,141, L166 (1994).
Choi et al., "Photoassisted tuning of silicon nanocrystal photoluminescence," Langmuir. Mar. 13, 2007;23(6):3388-94 (Epub Feb. 13, 2007).
Claim chart for U.S. Pat. No. 8,940,437 submitted by the patentee in the parallel US litigation.
Cui et al., "Diameter-controlled synthesis of single-crystal silicon nanowires," Applied Physics Letters 78 (15):2214-2216 (Apr. 2001).
Cui, "Nanowires for Biomedical Applications," Presentation (2005).
Declaration by Professor Kurt W. Kolasinski in support of Opposition to EP12182852.9.
Dubbelday et al., "Photoluminescent thin-film porous silicon on sapphire," Appl. Phys. Lett. 62, 1694 (1993).
Gao et al., "Selective Growth of Si Nanowire Arrays via Galvanic Displacement Processes in Water-in-Oil Microemulsions," J. Am. Chem. Soc., 127(13):4574-4575 (2005).
Gao, "Synthesis and electrochemical properties of carbon nanotubes and silicon nanowires"—PhD thesis in Applied and Material sciences, ProQuest May 11, 2006.
Garnett et al., "Growth and Electrical Characteristics of Platinum-Nanoparticle-Catalyzed Silicon Nanowires," Advanced Materials 19(19)1946-2950 (Aug. 2007).

(56) References Cited

OTHER PUBLICATIONS

Gole et al., "Direct synthesis of silicon nanowires, silica nanospheres, and wire-like nanosphere agglomerates," Appl. Phys. Lett. 76, 2346 (2000).
Hashim et al., "High Purity Polycrystalline Silicon Growth and Characterization," Chiang Mai J. Sci. 34(1) : 47-53 (2007).
Holzapfel et al., "A new type of nano-sized silicon/carbon composite electrode for reversible lithium insertion," Chem. Commun., 1566-1568 (2005).
Hu et al., "Controlled growth and electrical properties of heterojunctions of carbon nanotubes and silicon nanowires," Nature 399, 48-51 (1999).
Huang et al., "Phase Segregation Assisted Morphology Sculpting: Growth of Graphite and Silicon Crystals via Vapor-Solid Reactions," J. Phys. Chem. C, 111 (11), 4138-4145 (2007).
Huang et al., "Metal-Assisted Chemical Etching of Silicon: A Review," Advanced Materials 23(2):285-308 (Jan. 2011).
Iller, "Silica Gels and Powers," The Chemistry of Silica, Chapter 5 (1979).
Jones et al., "Chemical etching of silicon: Smooth, rough and glowing surfaces," Progress in Surface Science, 50(1):283-293 (1995).
Kasavajjula et al., "Nano- and Bulk-Silicon-Based Insertion Anodes for Lithium-ion Secondary Cells," Journal of Power Sources, 163 (2007) 1003-1039.
Kim et al., "Improvement of Silicon Powder Negative Electrodes by Copper Electroless Deposition for Lithium Secondary Batteries," Journal of Power Sources, 147 227-233 (2005).
Kim et al., "Preparation of silicon-CNT (carbon nano tube) composites for anode in lithium secondary batteries," (Abstract) 207th ECS Meeting, Abstract #163, May 15-20, 2005.
Kinoshita, "Advanced Anode Materials for Li-Ion Batteries" Ernest Orlando Lawrence Berkeley National Laboratory to be published in New Trends in Electrochemical Technology: Energhy Storage Systems for Electronics, Osaka and M. Datta, Gordon & Breach Science, p. 1-63 (Oct. 1997).
Koker et al., "Photoelectrochemical etching of Si and porous Si in aqueous HF," Phys. Chem. Chem. Phys. 2, 277-281 (2000).
Koker et al., "Laser-assisted formation of porous Si in diverse fluoride solutions: reaction kinetics an mechanistic implications," The Journal of Physical Chemistry B 105(18):3864-3871 (Feb. 2001).
Kolasinski, "Laser assisted restructuring of silicon over nano-, meso-, and macro-scales," In: Pandalai SG, editor. Recent research advances in applied physics, vol. 7. Kerala, India: Transworld Research Network; p. 267 (2004).
Kolasinski, "Catalytic growth of nanowires: Vapor-liquid-solid, vapor-solid-solid, solution-liquid-solid and solid-liquid-solid-growth," Current Opinion in Solid State and Materials Science 10(s 3-4):182-191 (Jun. 2006).
Kolasinski et al., "Laser assisted and wet chemical etching of silicon nanostructures," Journal of Vacuum Science & Technology A: Vacuum, Surfaces, and Films 24, 1474 (2006).
Kolasinski et al., "Pillars formed by laser ablation and modified by wet etching," Proceedings of the SPIE—The International Society for Optical Engineering, 6586, 65860H (2007).
Kolasinski, "Solid Structure Formation During the Liquid/Solid Phase Transition," Current Opinion in Solid State and Materials Science 11(5-6):76-85 (Oct.-Dec. 2007).
Kolasinski, "Porous Silicon Formation by Stain Etching," Handbook of Porous Silicon pp. 1-14 (2014).
Kolasinski, "Electron transfer during metal-assisted and stain etching of silicon," Semiconductor Science and Technology 31(1):014002 (Jan. 2016).
Lau et al., "High aspect ratio submicron silicon pillars fabricated by photoassisted electrochemical etching and oxidation," Appl. Phys. Lett. 67, 1877 (1995).
Law et al., "Semiconductor Nanowires and Nanotubes," Annual Review of Materials Research vol. 34:83-122 (2004).
Lew et al., "Vapor-liquid-solid growth of silicon-germanium nanowires," Adv Mater 15(24):2073-6 (2003).
Li et al., "Synthesis and Characterization of Silicon Nanowires on Mesophase Carbon Microbead Substrates by Chemical Vapor Deposition," J. Phys. Chem. B, 109 (8):3291-3297 (2005).
Li et al., "An In Situ X-Ray Diffraction Study of the Reaction of Li with Crystalline Si," J. Electrochem. Soc. 154(3):A156-A161 (2007).
Liang et al., "Study of lithiated Nation ionomer for lithium batteries," Journal of Applied Electrochemistry 34:1211(2004).
Lieber, "One-Dimensional nanostructures: Chemistry, Physics & Applications," Solid State Communications 107 (11):607-616 (Aug. 1998).
Lieber et al., "Functional nanowires," Functional Nanowires 32(2):99-108 (Feb. 2007).
Limaye et al., "Scaleable synthesis route for silicon nanocrystal assemblies," Phys Stat Sol (a) 204(5):1297-1301 (2007).
Ma et al., "Nest-like Silicon Nanospheres for High-Capacity Lithium Storage," Advanced Materials 19(22):4067-4070 (Nov. 2007).
Mills et al., "Laser-etched silicon pillars and their porosification," Journal of Vacuum Science & Technology A Vacuum Surfaces and Films 22(4):1647-1651 (2004).
Mills et al., "Non-lithographic method of forming ordered arrays of silicon pillars and macropores," Journal of Physics. D, Applied Physics 38(4); p. 632-636 (2005).
Mills et al., "Stain etching of silicon pillars and macropores," Physica Status Solidi (A) Applications and Materials 202 (8)1422-1426 (Jun. 2005).
Mills et al., "Surface texturing of Si, porous Si and TiO2 by laser ablation," Applied Surface Science 253:6575-6579(2007).
Nahidi et al., "Effects of Stain Etchant Composition on the Photoluminescence and Morphology of Porous Silicon," J. Electrochem. Soc. 153(1): C19-C26 (2006).
Obrovac et al., "Reversible Cycling of Crystalline Silicon Powder," J. Electrochem. Soc. 154(2): A103-A108 (2007).
Ogata et al., "Electrochemical metal deposition on silicon," Current Opinion in Solid State and Materials Science 10 (3)163-172 (Jun. 2006).
Panero et al., "Nanotechnology for the progress of lithium batteries R&D," Journal of Power Sources 129(1):90-95 (2004).
Peng et al., "Morphological selection of electroless metal deposits on silicon in aqueous fluoride solution," Electrochimica Acta 49(16):2563-2568 (2004).
Peng et al., "Aligned single-crystalline Si nanowire arrays for photovoltaic applications," Small 1(11):1062-7 (2005).
Peng et al., "Ordered silicon nanowire arrays via nanosphere lithography and metalinducedetching," Appl. Phys. Lett. 90, 163123 (2007).
Schalkwijk et al., "Advances in Lithium-Ion Batteries," Springer Science & Business Media, Berlin, Germany, 30 pages (2002).
Sharma et al., "Diameter control of Ti-catalyzed silicon nanowires," Journal of Crystal Growth 267(3):613-618 (2004).
Sinha et al., "Synthesis of Silicon Nanowires and Novel Nano-Dendrite Structures," AIP Conference Proceedings 544(1), 431-36 (2000).
Shin et al., "Nanoporous Structures Prepared by an Electrochemical Deposition Process," Adv. Mater. 15(19)1610-1614 (2003).
Shu et al., "Cage-like carbon nanotubes/Si composite as anode material for lithium ion batteries," Electrochemistry Communications 8(1):51-54 (Jan. 2006).
Sun et al., "Direct Growth of Mono- and Multilayer Nanostructured Porous Films on CurvedSurlaces and Their Application as Gas Sensors," Advanced Materials 17(23):2872-2877 (Dec. 2005).
Sunkara et al., "Bulk synthesis of silicon nanowires using a low-temperature vapor-liquid-solidmethod," Applied Physics Letters 79(10):1546-1548 (Sep. 2001).
Tsujino et al., "Boring deep cylindrical nanoholes in silicon using silver nanoparticles as a catalyst," Advanced Materials 17(8):1045-1047 (2005).
VestaSi Silicon Producer "SicoMill® Silicon Powder" product specification from www.vestasi.com.

(56) References Cited

OTHER PUBLICATIONS

Wakihara, "Recent developments in lithium ion batteries," Materials Science and Engineering: R: Reports 33 (4):109-134 (2001).
Wang, "Germanium nanowires: from synthesis, surface chemistry, and assembly to devices," Appl. Phys. A 85(3):217-225 (2006).
Whang et al., "Large-Scale Hierarchical Organization of Nanowires for Functional Nanosystems," Japanese Journal of Applied Physics, vol. 43, Part 1, No. 7B (2004).
Widenborg et al., "Polycrystalline Silicon Thin-Film Solar Cells on AIT-Textured Glass Superstrates," Advances in OptoElectronics, vol. 2007, Article ID 24584, 7 pages (2007).
Wu et al., "Ag-enhanced SEI formation on Si particles for lithium batteries," Electrochemistry Communications 5(11):935-939 (2003).
Xia et al., "One-Dimensional Nanostructures: Synthesis, Characterization, and Applications," Advanced Materials 15(5): 353-389 (2003).
Yang, "The Chemistry and Physics of Semiconductor Nanowires," MRS Bulletin 30(2):85-91 (Feb. 2005).
Yang et al., "Study on the Li+ Insertion/Extraction for Silicon Nanosized Silver Composite Electrode," Electrochem. Solid-State Lett. 10(3):A52-A55 (2007).
Yu et al., "Silicon Nanowires: Preparation, Device Fabrication, and Transport Properties," J. Phys. Chem. B, 104(50):11864-11870 (2000).
Zhang et al., "Composite anode material of silicon/graphite/carbon nanotubes for Li-Ionbatteries," Electrochimica Acta 51(23):4994-5000 (2006).
Zheng et al., "Nano-porous Si/C composites for anode material of lithium-ion batteries," Electrochimica Acta 52(19):5863-5867 (2007).
Zhou, "Quantitative V-L-S Growth Model and Experiments of Fe Catalyzed Si Nanowire Formation," MRS Online Proceeding Library Archive 737 F6.3.1-3.6 (Jan. 2002).
Notice of opposition filed against EP12182852.9 dated May 18, 2016.
Submission in Opposition filed filed against EP12182852.9 dated Dec. 30, 2016.
Sinha et al., "Synthesis of Silicon Nano-Dendrites," Mat. Res. Soc. Symp. Proc. vol. 676, 3 pages (2001).
Byon at al., "Synthesis and postgrowth doping of silicon nanowires", Applied Physics Letters, vol. 87, Issue 19, Article 193104, p. 1-5 (2005).
Chen et al., "Large-volume-change electrodes for Li-ion batteries of amorphous alloy particles held by elastomeric tethers," Electrochemistry Communications 5, p. 919-923 (2003).
Hwang et al., "Conductive and Porous Silicon Nanowire Anodes for Lithium Ion Batteries," J. Electrochem. Soc. 164 (7) A1564-A1568 (2017).
ICON Group International, "Nanowire: Webster's Timeline History, 1994-2007" (2010).
Karki, "Real-time investigation of individual silicon nanostructured electrodes for lithium-ion batteries" PhD Thesis, University of Maryland (2013).
Karki et al., "Lithium-Assisted Electrochemical Welding in Silicon Nanowire Battery Electrodes," Nano Lett., 12 (3), p. 1392-1397 (2012).
Li et al., "Nanosized alloy-based anode materials for Li ion batteries," Solid State Ionics: Materials & Devices, Procs of the 7th Asian Conf. Edited by Chowdari B.V.R et al., p. 343-349 (2000).
Li et al., "Nano-alloy anode for lithium ion batteries," Solid State Ionics 148(3-4), p. 247-258 (2002).

Li et al., "Growth Direction and Cross-Sectional Study of Silicon Nanowires," Adv. Mater. 15(7-8):607-609 (2003).
Li et al., H-titanate nanotube: a novel lithium intercalation host with large capacity and high rate capability, Electrochemistry Communications 7, p. 62-67 (2005).
Li et al., "Effect of Heat Treatment on Si Electrodes Using Polyvinylidene Fluoride Binder," Journal of The Electrochemical Society 155(3): A234-A238 (2008).
Mao et al., "Silicon nanowire synthesis by a vapor-liquid-solid approach," J Nanosci Nanotechnol. 5(5):831-5 (2005).
Osterloh et al., "Stringing up the Pearls: Self-Assembly, Optical and Electronic Properties of CdSe- and Au—LiMo3Se3 Nanoparticle-Nanowire Composites," Nano Letters, 3(2):125-129 (2003).
Pei et al., "Electrical properties of silicon nanowires," Chinese Journal of Electron Devices, vol. 28 No. 4, p. 949-953(2005).
Sharma et al., "Direct synthesis of single-crystalline silicon nanowires using molten gallium and silane plasma," Nanotechnology 15, p. 130-134 (2004).
Sides et al., "Nanoscale Materials for Lithium-Ion Batteries," Materials Research Society 27(8):604-607 (2002).
Thurber et al., "Resistivity-Dopant Density Relationship for Phosphorus-Doped Silicon," J. Electrochem. Soc. vol. 127, issue 8, 1807-1812 (1980).
Thurber et al., "Resistivity-Dopant Density Relationship for Boron-Doped Silicon," J. Electrochem. Soc. vol. 127, issue 10, 2291-2294 (1980).
University of Colorado, "Principles of Electronic Devices: Chapter 2—Carrier Transport," Feb. 28, 2002.
Wang et al., "Characterization of Nanocrystalline Si-MCMB Composite Anode Materials," Electrochemical and Solid-State Letters, 7(8), A250-A253 (2004).
Wu et al., "Agglomeration and the surface passivating film of Ag nano-brush electrode in lithium batteries," Solid State Ionics 149(3):185-192 (2002).
Wu et al., "Synthesis of Manganese Oxide Electrodes with Interconnected Nanowire Structure as an Anode Material for Rechargeable Lithium Ion Batteries," J. Phys. Chem. B, 109 (49), p. 23279-23284 (2005).
Xu et al., "Simple annealing process for performance improvement of silicon anode based on polyvinylidene fluoride binder," Journal of Power Sources 195(7):2069-2073 (2010).
Yoo et al., "Interaction of Poly(vinylidene fluoride) with Graphite Particles. 2. Effect of Solvent Evaporation Kinetics and Chemical Properties of PVDF on the Surface Morphology of a Composite Film and Its Relation to Electrochemical Performance," Chem. Mater., 16 (10), p. 1945-1953 (2004).
Yoshio et al., "Si as a Lithium-Ion Battery Anode Material," Journal of The Electrochemical Society 149(12):A1598-A1603(2002).
Yu et al., "Synthesis of nano-scale silicon wires by excimer laser ablation at high temperature," Solid State Communications 105(6):403-407 (1998).
Yue et al., "Controlled Growth and Structures of Molecular-Scale Silicon Nanowires," Nano Letters, 4(3):433-436(2004).
Zhang et al., "Urchin-like nano/micro hybrid anode materials for lithium ion battery," Carbon 44:2778-2784 (2006).
Zhang et al., "Composite anode material of silicon/graphite/carbon nanotubes for Li-ion batteries," Electrochimica Acta 51(23):4994-5000 (2006).
Holzapfel et al., "Nano silicon for lithium-ion batteries," Electrochimica Acta 52(3):973-978 (2006).
Zhang et al., "Silicon nanowires prepared by laser ablation at high temperature," Appl. Phys. Lett. 72(15):1835-1837(1998).
Defendants' Amended and Supplemental Invalidity Contentions (Aug. 23, 2017).

METHOD OF FABRICATING STRUCTURED PARTICLES COMPOSED OF SILICON OR A SILICON-BASED MATERIAL AND THEIR USE IN LITHIUM RECHARGEABLE BATTERIES

This application is a continuation of U.S. patent application Ser. No. 12/669,216, filed Feb. 26, 2010, which is a U.S. National State application of International Patent Application no. PCT/GB2008/002452, which claims priority to U.K. Patent Application no. GB0713898.5, filed Jul. 17, 2007, each of which is hereby incorporated herein by reference in its entirety.

The invention relates to a particle comprising silicon, a method of fabricating a particle, an electrode containing particles as its active material, an electrochemical cell, a lithium rechargeable cell anode, a cell, a device powered by a cell, a method of creating a composite electrode, a method of fabricating a lithium rechargeable cell and a method of fabricating silicon-comprising fibres.

The recent increase in the use of portable electronic devices such as mobile telephones and notebook computers and the emerging trend of using rechargeable batteries in hybrid electric vehicles has created a need for smaller, lighter, longer lasting rechargeable batteries to provide the power to the above mentioned and other battery powered devices. During the 1990s, lithium rechargeable batteries, specifically lithium-ion batteries, became popular and, in terms of units sold, now dominate the portable electronics marketplace and are set to be applied to new, cost sensitive applications. However, as more and more power hungry functions are added to the above mentioned devices (e.g. cameras on mobile phones), improved and lower cost batteries that store more energy per unit mass and per unit volume are required.

It is well known that silicon can be used as the active anode material of a rechargeable lithium-ion electrochemical battery cell (see, for example, Insertion Electrode Materials for Rechargeable Lithium Batteries, M. Winter, J. O. Besenhard, M. E. Spahr, and P. Novak in Adv. Mater. 1998, 10, No. 10). The basic composition of a conventional lithium-ion rechargeable battery cell is shown in FIG. 1 including a graphite-based anode electrode, the component to be replaced by the silicon-based anode. The battery cell includes a single cell but may also include more than one cell.

The battery cell generally comprises a copper current collector 10 for the anode and an aluminium current collector 12 for the cathode which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16 and a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based layer where it reacts with the graphite to create the compound, $LiC_6$. The graphite, being the electrochemically active material in the composite anode layer, has a maximum capacity of 372 mAh/g. It will be noted that the terms "anode" and "cathode" are used in the sense that the battery is placed across a load.

It is generally believed that silicon, when used as an active anode material in a lithium-ion rechargeable cell, provides a significantly higher capacity than the currently used graphite. Silicon, when converted to the compound $Li_{21}Si_5$ by reaction with lithium in an electrochemical cell, has a maximum capacity of 4,200 mAh/g, considerably higher than the maximum capacity for graphite. Thus, if graphite can be replaced by silicon in a lithium rechargeable battery the desired increase in stored energy per unit mass and per unit volume can be achieved.

Existing approaches of using a silicon or silicon-based active anode material in a lithium-ion electrochemical cell have failed to show sustained capacity over the required number of charge/discharge cycles and are thus not commercially viable.

One approach disclosed in the art uses silicon in the form of a powder (say as particles or spherical elements with a 10 μm diameter), in some instances made into a composite with or without an electronic additive and containing an appropriate binder such as polyvinylidene difluoride coated onto a copper current collector. However, this electrode system fails to show sustained capacity when subjected to repeated charge/discharge cycles. It is believed that this capacity loss is due to partial mechanical isolation of the silicon powder mass arising from the volumetric expansion/contraction associated with lithium insertion/extraction to and from the host silicon. In turn this gives rise to electrical isolation of the silicon elements from both the copper current collector and themselves. In addition, the volumetric expansion/contraction causes the spherical elements to be broken up causing a loss of electrical contact within the spherical element itself.

Another approach known in the art designed to deal with the problem of the large volume changes during successive cycles is to make the size of the silicon elements that make up the silicon powder very small, that is to use spherical particles that have diameters in the 1-10 nm range. This strategy assumes that the nano-sized elements can undergo the large volumetric expansion/contraction associated with lithium insertion/extraction without being broken up or destroyed. However, this approach is problematic in that it requires the handling of very fine, nano-sized powder that may pose a health and safety risk and it does not prevent the electrical isolation of the spherical elements from both the copper current collector and themselves as the silicon powder undergoes the volumetric expansion/contraction associated with lithium insertion/extraction. Importantly, the large surface area of the nano-sized elements can give rise to the creation of a lithium-containing surface film that introduces a large irreversible capacity into the lithium-ion battery cell. In addition, the large number of small silicon particles creates a large number of particle-to-particle contacts for a given mass of silicon and these each have a contact resistance and may thus cause the electrical resistance of the silicon mass to be too high. The above problems have thus prevented silicon particles from becoming a commercially viable replacement for graphite in lithium rechargeable batteries and specifically lithium-ion batteries.

In another approach described by Ohara et al. in Journal of Power Sources 136 (2004) 303-306 silicon is evaporated onto a nickel foil current collector as a thin film and this structure is then used to form the anode of a lithium-ion cell. However, although this approach gives good capacity retention, this is only the case for very thin films (say ~50 nm) and thus these electrode structures do not give usable amounts of capacity per unit area. Increasing the film thickness (say >250 nm) causes the good capacity retention to be eliminated. The good capacity retention of these thin films is considered by the present inventors to be due to the ability of the thin film to absorb the volumetric expansion/contraction associated with lithium insertion/extraction from the host silicon without the film being broken up or destroyed. Also, the thin film has a much lower surface area than the equivalent mass of nano-sized particles and thus the amount of irreversible capacity due to the formation of a lithium-containing surface film is reduced. The above problems have thus prevented a thin film of silicon on a metal foil current collector from becoming a commercially viable replacement for graphite in lithium rechargeable batteries and specifically lithium-ion batteries.

In another approach described in US2004/0126659, silicon is evaporated onto nickel fibres which are then used to form the anode of a lithium battery.

However this is found to provide an uneven distribution of silicon on the nickel fibres hence significantly affecting operation. In addition, these structures have a high ratio of nickel current collector mass to active silicon mass and thus do not give usable amounts of capacity per unit area or per unit mass.

A review of nano- and bulk-silicon-based insertion anodes for lithium-ion secondary cells has been provided by Kasavajjula et al (J. Power Sources (2006), doi:10.1016/jpowsour.2006.09.84), herewith incorporated by reference herein.

Another approach described in UK Patent Application GB2395059A uses an silicon electrode comprising a regular or irregular array of silicon pillars fabricated on a silicon substrate. These structured silicon electrodes show good capacity retention when subjected to repeated charge/discharge cycles and this good capacity retention is considered by the present inventors to be due to the ability of the silicon pillars to absorb the volumetric expansion/contraction associated with lithium insertion/extraction from the host silicon without the pillars being broken up or destroyed. However, the structured silicon electrodes described in the above publication is fabricated by using a high purity, single crystal silicon wafer and hence produces an electrode with a potentially high cost.

The first aspect of the invention provides a particle comprising silicon having a particle core and an array of silicon-comprising pillars extending therefrom.

The pillars may be regular or irregular. The pillars of the present invention are 0.08 to 0.70 microns in one dimension, preferably 0.1 to 0.5 microns, more preferably 0.2 to 0.4 microns, and most preferably 0.3 microns or above. In a second dimension, the pillars are 4 to 100 microns, preferably 10 to 80 microns, more preferably 30 microns or above. The pillars thus have an aspect ratio of greater than 20:1. The pillars may have a substantially circular cross-section or a substantially non-circular cross-section.

The pillared particle may comprise undoped silicon, doped silicon or a mixture, such as a silicon-germanium mixture. In particular, the particle may have a silicon-purity of 90.00% to 99.95% by mass, preferably 90.0% to 99.5%. The silicon can be doped with any material for example, phosphorous, aluminium, silver, boron and/or zinc. The particle may be relatively low purity metallurgical grade silicon.

The particles may be regular or irregular in cross section and can be from 10 µm to 1 mm in diameter, preferably 20 µm to 150 µm, more preferably 25 µm to 75 µm.

The second aspect of the invention provides a method of fabricating a particle of the first aspect, comprising the steps of etching a particle comprising silicon. In particular, the pillars can be created by chemical reaction etching or galvanic exchange etching.

The third aspect of the invention provides a composite electrode containing particles as defined in the first aspect of the invention as one of its active materials. In particular, the third aspect provides a composite electrode which uses copper as a current collector. In a feature of the third aspect, the electrode can be an anode.

The third aspect therefore further provides an electrochemical cell containing an electrode as defined above. In particular, there is provided an electrochemical cell in which the cathode comprises a lithium-containing compound capable of releasing and reabsorbing lithium ions as its active material. In particular, there is provided an electrochemical cell in which the cathode comprises lithium-based metal oxide or phosphate as its active material preferably $LiCoO_2$ or $LiMn_xNi_xCo_{1-2x}O_2$ or $LiFePO_4$.

The invention further provides a lithium rechargeable cell anode comprising particles of the first aspect. In particular, there is provided an anode in which the particles are part of a composite.

The third aspect further provides a cell comprising an anode and a cathode wherein the cathode preferably comprises lithium-based material, more preferably lithium cobalt dioxide.

There is further provided a device powered by a cell as defined above.

The fourth aspect of the invention provides a method of creating a composite electrode comprising the steps of preparing a solvent-based slurry containing pillared particles, coating the slurry onto a current collector and evaporating the solvent to create a composite film.

The invention further provides a method of fabricating a lithium rechargeable cell comprising the steps of creating an anode as defined above and adding a cathode an electrolyte. In particular, the method further comprising adding a separator between cathode and the anode. A casing may be provided around the cell.

There is also provided a method of fabricating silicon-comprising fibres in which the pillars are detached from a particle of the first aspect by one or more of scraping, agitating or chemical etching.

The production of an anode electrode structure using the structured particles of the invention further overcomes the problems of reversibly reacting silicon with lithium. In particular by arranging the particles in a composite structure, that is a mixture of particles, a polymer binder and an conductive additive, or by directing bonding the structured particles to the current collector, the charge/discharge process becomes reversible and repeatable and good capacity retention is achieved. This good reversibility is considered by the present inventors to be due to the ability of the silicon pillars forming part of the structured silicon particle to absorb the volumetric expansion/contraction associated with lithium insertion/extraction from the host silicon without the pillars being broken up or destroyed. Importantly, the silicon electrodes described in this invention are fabricated by using a low purity, metallurgical grade silicon and hence produces an electrode with a potentially low cost.

Embodiments of the invention will now be described, by way of example, with reference to the figures, of which:

In overview the invention allows creation of pillared particles of silicon or silicon-comprising material and the use of these particles to create both a composite anode structure with a polymer binder, an conductive additive (if required) and a metal foil current collector and an electrode structure. In particular it is believed that the structure of the particles that make up the composite overcomes the problem of charge/discharge capacity loss. By providing a particle with a plurality of elongate or long thin pillars the problem of charge/discharge capacity loss is reduced.

Typically the pillars will have a length to diameter ratio of approximately 20:1. The insertion and removal of lithium into the pillars, although causing volume expansion and volume contraction, does not cause the pillars to be destroyed and hence the intra-fibre electronic conductivity is preserved.

The pillars can be made on the particles by wet etching/using a chemical galvanic exchange method for example as described in our co-pending application GB 0601318.9 with common assignees and entitled "Method of etching a silicon-based material", incorporated herewith by reference. A related method which may also be used has been disclosed in Peng K-Q, Yan, Y-J Gao, S-P, Zhu J., Adv. Materials, 14 (2004), 1164-1167 ("Peng"); K. Peng et al, Angew. Chem. Int. Ed., 44 2737-2742; and K. Peng et al., Adv. Funct. Mater., 16 (2006), 387-394; K. Peng, Z. Huang and J. Zhu, Adv. Mater., 16 (2004), 127-132; and T. Qui, L. Wu, X. Yang, G. S. Huang and Z. Y. Zhang, Appl. Phys. Lett., 84 (2004), 3867-3869. The above-mentioned methods are used to produce pillars from a high purity silicon wafer.

Figure 2:
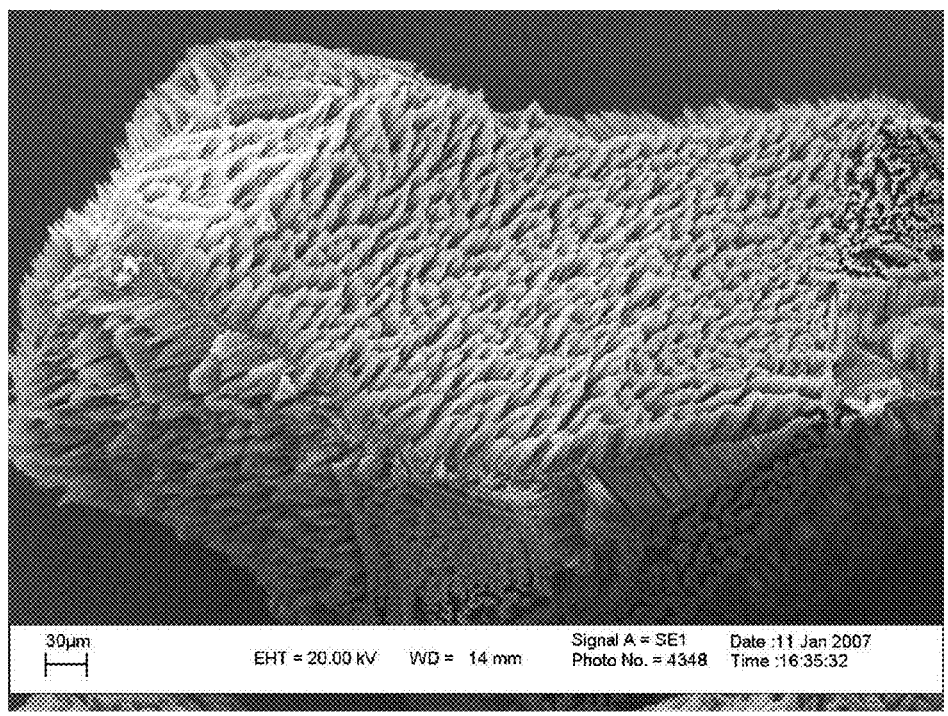
FIG. 2 is a electron micrograph of a pillared particle according to embodiments of the present invention.

In a preferred embodiment of the present invention, pillars are produced on crystalline particles of relatively low purity silicon such as metallurgical grade silicon. The method comprises the five steps of: grinding and sieving; washing; nucleation; etching; and silver removal, as explained, by way of example only, later. An electron micrograph of pillared particle made in accordance with present invention is shown in FIG. 2.

Any appropriate grinding process is suitable such as power grinding or ball milling. The skilled person will appreciate that a minimum particle size will exist below which pillars cannot be etched onto the surface and instead the particle will be homogeneously etched away. Particles having a diameter less than 0.5 μm may be too small.

A more uniform pillar array, in terms of density and height, is produced by nucleating before etching. This step produces a uniform distribution of silver nuclei/islands (nuclei combine and form silver islands that are the site for pillar growth).

Figure 3:
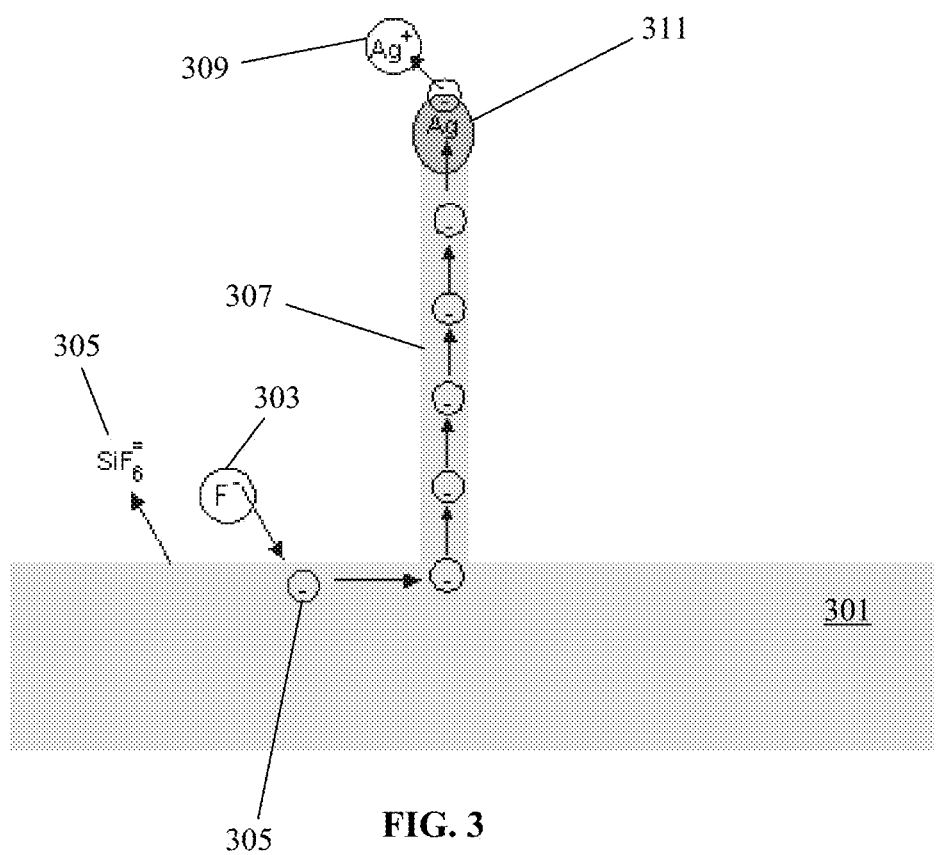
FIG. 3 shows the overall galvanic exchange etching mechanism.

Silver islands delineate the formation of pillars and galvanic fluoride etching of the {100} planes:see FIG. 3. Referring to FIG. 3 there is shown a silicon surface 301 having a pillar 307. An electron 305 is transferred from a fluoride ion 303 to the silicon surface 301. The reaction of fluorine with silicon 301 and fluoride ions 303 gives rise to fluorosilicate ions 305. This is the anodic etching process. The cathode process is the discharge of silver ions 309 to produce metallic silver 311.

The structure is explained by supposing that silicon-fluoride bonds are formed as an essential step in the etch process. And furthermore that structures that are Si—F (mono-fluoride) are stable and those that are F—Si—F(di-fluoride) and Si[—F]3 (tri-fluoride) are not stable. This is because of steric interference on the Si surface of nearest neighbour groups. The case of the {111} plane is that, a mono-fluoride surface, stable except at the edges, inevitably proceeds to a tri-fluoride surface and consequent instability. The {110} surface is the only stable major crystal plane of Si that will have exclusively mono-fluoride bonds-hence its stability and the etch rate ratio [etch rate <100>]:[etch rate <110>] of about three orders of magnitude. So the sides of the pillars will be terminated on {110} planes.

A pillar surface density may be used to define the density of the pillars on the surface of the particle. Herein, this is defined as F=P/[R+P] wherein: F is the pillar surface density; P is the total surface area of the particle occupied by pillars; and R is the total surface area of the particle unoccupied by pillars.

The larger the pillar surface density, the larger the lithium capacity per unit area of a silicon particle electrode and the larger the amount of harvestable pillars available to create fibres.

For example, using the above-mentioned silicon powder from Elken of Norway having a pre-etching size of 400×300×200 μm, pillars are produced all over the surface having a pillar height of approximately 25 to 30 μm, a diameter of approximately 200 to 500 nm and a pillar surface density, F, of 10-50%, more typically, 30%.

For example, particles having a pre-etching size of approximately 63-80×50×35 μm are found to produce pillars with a height of approximately 10 to 15 μm, with a coverage of approximately 30% and a diameter of approximately 200 to 500 nm In a preferred embodiment, pillars of for example 100 microns in length and 0.2 microns in diameter are fabricated on and from a silicon-comprising particle. More generally pillars of length in the range of 4 to 100 microns and diameter or transverse dimension in the range of 0.08 to 0.70 microns are fabricated from a particle having an initial size of 10 to 1000 μm.

According to the process, the silicon particles may be predominantly n- or p-type and, according to the chemical approach, and may be etched on any exposed (100), (111) or (110) crystal face. Since the etching proceeds along crystal planes, the resulting pillars are single crystals. Because of this structural feature, the pillars will be substantially straight facilitating length to diameter ratio of greater than 20:1.

The pillared-particles may then be used to form a composite electrode as described later. Alternatively, the pillars may be detached from the particle and used to form a fibre-based electrode. The detached pillars may also be described as fibres.

The invention encompasses the detachment of the pillars from the particle. The particle, with pillars attached, can be placed in a beaker or any appropriate container, covered in an inert liquid such as ethanol or water and subjected to ultra-sonic agitation. It is found that within several minutes the liquid is seen to be turbid and it can be seen by electron microscope examination that at this stage the pillars have been removed from the particle.

In an embodiment, the pillars are removed from the particle in a two stage process. In the first stage, the particles are washed several times in water and, if necessary, dried in a low vacuum system to remove the water. In the second stage, the particles are agitated in an ultrasonic bath to detach the pillars. These are suspended in water and then filtered using different various filter paper sizes to collect the silicon fibres.

It will be appreciated that alternative methods for "harvesting" the pillars include scraping the particle surface to detach them or detaching them chemically. One chemical approach appropriate to n-type silicon material comprises etching the particle in an HF solution in the presence of backside illumination.

Once the pillared particles have been fabricated they can be used as the active material in a composite anode for lithium-ion electrochemical cells. To fabricate a composite anode, the pillared particles are mixed with polyvinylidene difluoride and made into a slurry with a casting solvent such as n-methyl pyrrolidinone. This slurry can then be applied or coated onto a metal plate or metal foil or other conducting substrate for example physically with a blade or in any other appropriate manner to yield a coated film of the required thickness and the casting solvent is then evaporated from this film using an appropriate drying system which may employ elevated temperatures in the range of 50 degrees C. to 140 degrees C. to leave the composite film free or substantially free from casting solvent. The resulting composite film has a porous structure in which the mass of silicon-based pillared particles is typically between 70 percent and 95 percent. The composite film will have a percentage pore volume of 10-30 percent, preferably about 20 percent.

Figure 1:
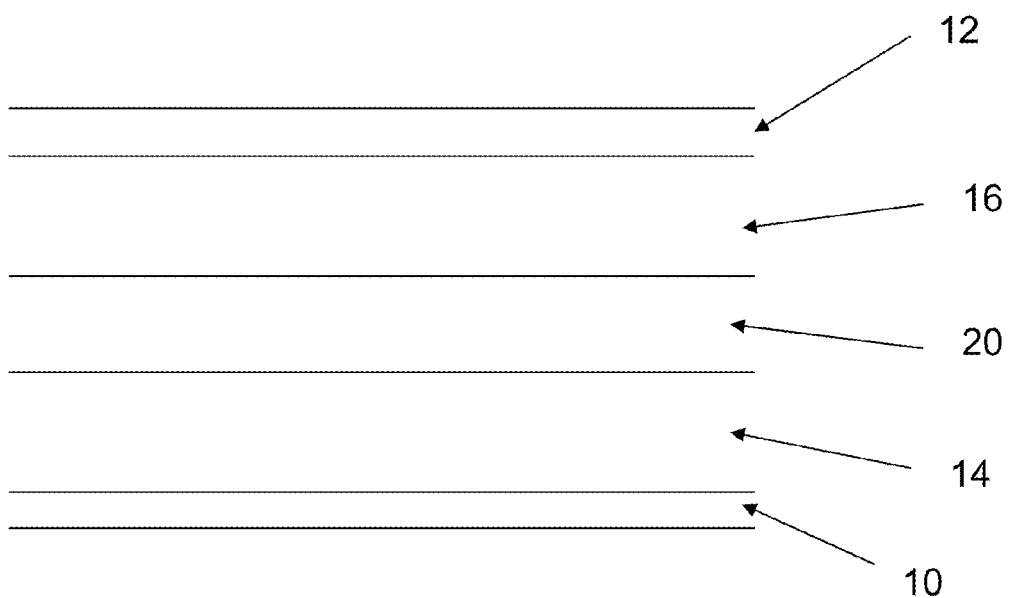
FIG. 1 is a schematic diagram showing the components of a battery cell.

Fabrication of the lithium-ion battery cell thereafter can be carried out in any appropriate manner for example following the general structure shown in FIG. 1 but with a silicon-comprising active anode material rather than a graphite active anode material. For example the silicon particle-based composite anode layer is covered by the porous spacer 20, the electrolyte added to the final structure saturating all the available pore volume. The electrolyte addition is done after placing the electrodes in an appropriate casing and may include vacuum filling of the anode to ensure the pore volume is filled with the liquid electrolyte.

Some embodiments provide an electrode containing as its active material a plurality of pillared particles of silicon. Capacity retention is improved as the pillared structure of the silicon allows for accommodation of the volume expansion associated with insertion/extraction (charging and discharging) of lithium. Advantageously, the pillared particles may be created by etching lumps of low purity, silicon (termed metallurgical grade silicon) such that a core of silicon remains covered by pillars that are between 0.08 μm and 0.5 μm in diameter and between 4 μm and 150 μm in length.

A particular advantage of the approach described herein is that large sheets of silicon-based anode can be fabricated and then rolled or stamped out subsequently as is currently the case in graphite-based anodes for lithium-ion battery cells meaning that the approach described herein can be retrofitted with the existing manufacturing capability.

The invention will now be illustrated by reference to one or more of the following non-limiting examples:

Grinding and Seiving

In the first stage, widely-available metallurgical grade silicon, such as "Silgrain" from Elkem of Norway, was ground and sieved to produce particles in the range 10 to 1000 μm, preferably 30 to 300 μm and more preferably 50 to 100 μm.

Washing

The second stage comprised washing the ground and sieved particles in water to remove any fine particles stuck to the big particles. The washed particles were then treated in diluted $HNO_3$ (1 mol·L) or $H_2SO_4/H_2O_2$ (1:2 in volume) or $H_2O_2/NH_3H_2O/H_2O_2$ (1:1:1 in volume) in 10 minutes to get rid of the possible organic or metal impurities.

Nucleation

In the third stage, a nucleation reaction was carried out in a solution of 17.5 ml HF (40%)+20 ml $AgNO_3$ (0.06 mol/l)+2.5 ml EtOH (97.5%)+10 ml $H_2O$ for 7~10 minutes at room temperature (~23° C.) using 0.1 g of silicon particles with the dimension of about 400×300×200 μm. For the same weight of silicon, smaller silicon particles required a larger solution volume due to the increased surface area to volume ratio.

The effect of ethanol at room temperature was to slow the chemical processes which gives a more uniform distribution of silver islands. The time (especially at the upper limit) was sufficient to consume a significant amount of the solution silver.

Etching

The fourth stage comprised etching. The etching reaction used a solution of 17.5 ml HF (40%)+12.5 ml $Fe(NO_3)_3$ (0.06 mol·l)+2 ml $AgNO_3$ (0.06 mol·l)+18 ml $H_2O$ for 1~1.5 hours at room temperature (~23° C.) using 0.1 g of silicon particles with the dimension of about 400×300×200 μm. For the same weight of silicon, smaller silicon particles required a larger solution volume due to the increased surface area to volume ratio. In addition, as the particle size decreases, a shorter time is needed for smaller silicon particles, for example, 30 min for 100~120 μm (sieve size) sample and 20 min for 63~80 μm sample.

In further modifications, stirring increased the etch rate possibly owing to the discharge of hydrogen. Here, the out diffusion of fluorosilicate ion was rate limiting.

The skilled person will understand that oxidizing agents other than $Ag^+$ may be equally suitable. For example: $K_2PtCl_6$; $Cu(NO_3)_2$; $Ni(NO_3)_2$; $Mn(NO_3)_2$; $Fe(NO_3)_3$; $Co(NO_3)_2$; $Cr(NO_3)_2$; $Mg(NO_3)_2$. Compounds involving Cu and Pt, having potentials higher than hydrogen, give metal deposition (Cu and Pt) but the others, except for Ni, do not.

Figure 4:
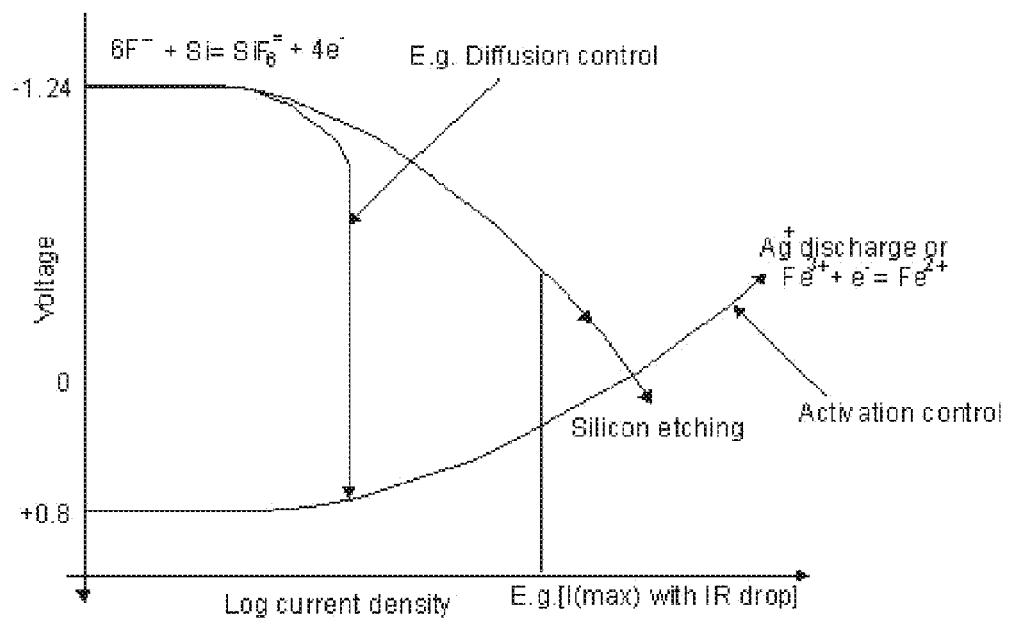
FIG. 4 shows hypothetical kinetic curves in the form of the partial currents in the galvanic exchange etching process.

The overall galvanic exchange etching mechanism can be illustrated using FIGS. 3 and 4. In FIG. 3 the anodic process,

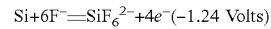

$$Si + 6F^- = SiF_6^{2-} + 4e^- (-1.24 \text{ Volts})$$

is the local etching of silicon. While the removal of the electrons accompanied by the discharge of silver ions is the cathodic process

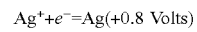

$$Ag^+ + e^- = Ag (+0.8 \text{ Volts})$$

For standard conditions the overall cell voltage is 2.04 volts. The other cathodic couples of interest are $Cu/Cu^{2+}$ (+0.35V); $PtCl_6^{2-}/PtCl_4^{2-}$ (+0.74V); $Fe^{3+}/Fe^{2+}$ (+0.77V), since they are all positive with respect to hydrogen. Couples that are more negative than $H^+/H_2$ will be in competition with hydrogen and will be largely ineffective. FIG. 4 shows a schematic version of the partial electrode reactions.

Silver Removal

The final stage of the process involved removing the silver which was left on the etched silicon particles from the third and fourth stages. The silver was removed (and saved) using a solution of 15% $HNO_3$ for 5~10 min.

It will be appreciated, of course, that any appropriate approach can be adopted in order to arrive at the approaches and apparatus described above. For example the pillar detaching operation can comprise any of a shaking, scraping, chemical or other operation as long as pillars are removed from the particles. The particles can have any appropriate dimension and can for example be pure silicon or doped silicon other silicon-comprising material such as a silicon-germanium mixture or any other appropriate mixture. The particles from which pillars are created may be n- or p-type, ranging from 100 to 0.001 Ohm cm, or it may be a suitable alloy of silicon, for example $Si_xGe_{1-x}$. The particles may be metallurgical grade silicon.

The particles and/or the detached pillars can be used for any appropriate purpose such as fabrication of electrodes generally including cathodes. The cathode material can be of any appropriate material, typically a lithium-based metal oxide or phosphate material such as $LiCoO_2$, $LiMn_xNi_xCo_{1-2x}O_2$ or $LiFePO_4$. The features of different embodiments can be interchanged or juxtaposed as appropriate and the method steps performed in any appropriate order.

Although relatively high purity single crystal wafers of silicon can be etched to produce pillars of the desired parameters, the wafers themselves are very expensive owing to their high purity. Furthermore, it is difficult to arrange a pillared-wafer into an electrode-geometry. Embodiments of the present invention are advantageous because metallurgical grade silicon is relatively cheap and pillared particles may themselves be incorporated into a composite electrode without further processing. Also, pillared particles are a good source of silicon fibres and can be used themselves as the "active" ingredient in a battery electrode.

The particles used for etching may be crystalline for example mono- or poly-crystalline with a crystallite size equal to or greater than the required pillar height. The polycrystalline particle may comprise any number of crystals from example two or more.

Advantageously, metallurgical grade silicon is particularly suitable as a battery electrode because of the relatively high density of defects (compared to silicon wafers used in the semiconductor industry). This leads to a low resistance and hence high conductivity.

As the skilled person will understand, both n-type and p-type silicon can be etched and any density of charge carriers is appropriate provided the material does not become significantly degenerate.

The invention claimed is:

1. A plurality of discrete particles, wherein each particle comprises silicon and includes a particle core and a plurality of silicon-comprising elongate structures, each extending outwardly from the particle core from a first end to a second end, wherein each of the plurality of elongate structures is attached to the core at the first end of the elongate structure and the second end of the elongate structure is an unattached free end, and wherein the elongate structures are capable of being lithiated and delithiated.

2. A plurality of discrete particles as claimed in claim 1 wherein the plurality of discrete particles is in the form of a powder.

3. A plurality of discrete particles as claimed in claim 1 wherein each particle consists essentially of the particle core and the plurality of silicon-comprising elongate structures.

4. A plurality of discrete particles as claimed in claim 1 wherein the elongate structures consist essentially of silicon.

5. A plurality of discrete particles as claimed in claim 1 wherein the particles have a first dimension of at least 0.5 µm.

6. A plurality of discrete particles as claimed in claim 5, wherein in each of the plurality of discrete particles, the fraction of the surface area of the particle core occupied by the elongate structures is in the range of 0.10 to 0.50.

7. A plurality of discrete particles as claimed in claim 1 wherein the particles have a first dimension in the range of 10 µm to 1 mm.

8. A plurality of discrete particles as claimed in claim 1, wherein the elongate structures have a diameter in the range of 0.08 to 0.70 microns.

9. A plurality of discrete particles as claimed in claim 1 in which the elongate structures have a length from the first end to the second end in the range of 4 to 100 microns.

10. A plurality of discrete particles as claimed in claim 1 in which the elongate structures have an aspect ratio of greater than 20:1.

11. A plurality of discrete particles as claimed in claim 1 in wherein the particles comprise n-type silicon, p-type silicon, an alloy of silicon or a silicon-germanium mixture.

12. A plurality of discrete particles as claimed in claim 1 wherein the silicon-comprising elongate structures have a silicon purity of 90.00 to 99.95% by mass.

13. A plurality of discrete particles as claimed in claim 1 in which the plurality of elongate structures coat one or more surfaces of each particle.

14. A plurality of discrete particles as claimed in claim 1 in which the plurality of silicon-comprising elongate structures have sides terminated on {110} planes.

15. A plurality of discrete particles as claimed in claim 1, wherein the particles have a diameter of at least 0.5 µm and the elongate structures have an aspect ratio of greater than 20:1.

16. A plurality of discrete particles as claimed in claim 15, wherein in each of the plurality of discrete particles, the fraction of the surface area of the particle core occupied by the elongate structures is in the range of 0.10 to 0.50.

17. A composite structure for an electrode comprising a plurality of discrete particles as claimed in claim 16; and at least one of a conductive additive and a binder.

18. A plurality of discrete particles as claimed in claim 15 wherein the elongate structures have a diameter in the range of 0.08 to 0.70 microns; and the elongate structures have a length from the first end to the second end in the range of 4 to 100 microns.

19. A plurality of discrete particles as claimed in claim 15, wherein the particles have a diameter in the range of 10 µm to 1 mm.

20. A plurality of discrete particles as claimed in claim 15, wherein the elongate structures comprise doped silicon.

21. A plurality of discrete particles as claimed in claim 15, wherein the elongate structures comprise silicon having a purity of 90.00% to 99.95% by mass.

22. A plurality of discrete particles as claimed in claim 21, wherein the elongate structures and the particle core are formed from the same material.

23. A plurality of discrete particles as claimed in claim 21, wherein in each of the plurality of discrete particles, the plurality of elongate structures coat one or more surfaces of each particle.

24. A composite structure for an electrode comprising a plurality of discrete particles as claimed in claim 23; and at least one of a conductive additive and a binder.

25. A plurality of discrete particles as claimed in claim 21, wherein in each of the plurality of discrete particles, the plurality of elongate structures extend over all the surfaces of the particle core.

26. A plurality of discrete particles as claimed in claim 21, wherein in each of the plurality of discrete particles, the fraction of the surface area of the particle core occupied by the elongate structures is in the range of 0.10 to 0.50.

27. A plurality of discrete particles as claimed in claim 21, wherein the elongate structures comprise metallurgical grade silicon.

28. A plurality of discrete particles as claimed in claim 21, wherein in each of the plurality of discrete particles, the particle core comprises silicon having a purity of 90.00% to 99.95% by mass.

29. A plurality of discrete particles as claimed in claim 21, wherein in each of the particles, the particle core is crystalline or polycrystalline.

30. A composite structure for an electrode comprising a plurality of discrete particles as claimed in claim 21; and at least one of a conductive additive and a binder.

31. A plurality of discrete particles as claimed in claim 15, wherein in each of the plurality of discrete particles, the particle core comprises undoped silicon or doped silicon.

32. A plurality of discrete particles as claimed in claim 15, wherein the elongate structures are formed from doped silicon.

33. A plurality of discrete particles as claimed in claim 15, wherein the elongate structures are formed from silicon having a purity of 90.00% to 99.95% by mass.

34. A plurality of discrete particles as claimed in claim 1, wherein the particles have a diameter of at least 0.5 μm; the elongate structures have a diameter in the range of 0.08 to 0.70 microns; and the elongate structures have a length from the first end to the second end in the range of 4 to 100 microns; the elongate structures are formed from silicon having a purity of 90.00% to 99.95% by mass; the elongate structures have an aspect ratio of greater than 20:1; and the plurality of elongate structures coat one or more surfaces of each particle.

35. A composite structure for an electrode comprising a plurality of discrete particles as claimed in claim 34; and at least one of a conductive additive and a binder.

36. A composite structure for an electrode comprising a plurality of discrete particles as claimed in claim 1; and at least one of a conductive additive and a binder.

37. A composite structure for an electrode as claimed in claim 36, in which the plurality of discrete particles comprise 70 to 95% by mass of the composite structure.

38. A composite structure according to claim 36, in the form of a porous composite film.

39. A composite structure according to claim 38, having a pore volume of 10-30%.

40. A method for making the composite structure of claim 38, comprising:
providing a slurry containing the plurality of discrete particles in a solvent;
coating the slurry onto a current collector; and
evaporating the solvent to form the porous composite film.

41. A composite structure according to claim 36, wherein the plurality of particles make up 70-95% by weight of the porous composite film.

42. A plurality of discrete particles, wherein each particle comprises silicon and includes a particle core and a plurality of silicon-comprising elongate structures extending outwardly therefrom from a first end to a second end, wherein the plurality of elongate structures are attached to the core at the first end of the elongate structure and unattached to the core at the second end, and wherein the silicon-comprising elongate structures are capable of being lithiated and delithiated and are capable of withstanding the volumetric expansion and contraction associated with lithium insertion and extraction without breaking.

* * * * *